United States Patent [19]
Vesely

[11] 3,926,855
[45] Dec. 16, 1975

[54] METHOD OF CATALYST MANUFACTURE

[75] Inventor: Kenneth D. Vesely, Arlington Heights, Ill.

[73] Assignee: Universal Oil Products, Company, Des Plaines, Ill.

[22] Filed: Jan. 21, 1974

[21] Appl. No.: 435,370

Related U.S. Application Data

[63] Continuation-in-part of Ser. No. 310,500, Nov. 29, 1972, abandoned, which is a continuation-in-part of Ser. No. 124,575, March 15, 1971, abandoned.

[52] U.S. Cl............................... 252/465; 252/466 J
[51] Int. Cl.².......................................... B01J 21/04
[58] Field of Search.................................... 252/465

[56]  References Cited
UNITED STATES PATENTS

| | | | |
|---|---|---|---|
| 2,952,644 | 9/1960 | Holden | 252/465 |
| 3,020,245 | 2/1962 | Reitmeier | 252/465 |
| 3,104,228 | 9/1963 | Vance et al. | 252/465 |
| 3,152,091 | 10/1964 | Gring | 252/464 |
| 3,213,040 | 10/1965 | Pedigo et al. | 252/465 |

*Primary Examiner*—W. J. Shine
*Attorney, Agent, or Firm*—James R. Hoatson, Jr.; Robert W. Welch; William H. Page, II

[57] ABSTRACT

Alumina is dry-mixed with an oxide of an iron group metal and an oxide of a Group VIB metal, or compounds convertible thereto upon subsequent calcination, and the blend is discharged into contact with a peptizing agent on a pelletizing disc to form spheroidal pellets. Upon calcination in an oxidizing atmosphere, the composite is particularly useful as a hydrotreating catalyst for the conversion and separation of nitrogenous and sulfurous compounds contained in petroleum fractions.

6 Claims, No Drawings

METHOD OF CATALYST MANUFACTURE

RELATED APPLICATIONS

This application is a continuation-in-part application of a copending application Ser. No. 310,500 filed Nov. 29, 1972, and now abandoned, which is in turn a continuation-in-part application of a copending application Ser. No. 124,575 filed Mar. 15, 1971, and now abandoned.

This invention relates to the manufacture of a catalyst composition particularly adapted to the hydrotreating of petroleum fractions for the conversion and separation of sulfurous and nitrogenous compounds contained therein.

It has become well known that the oxides of sulfur, plus lesser amounts of other sulfurous compounds, are among the major pollutants of the atmosphere, and the combustion of sulfur-containing petroleum products has been recognized as a primary source of said pollutants. It is the practice to effect the conversion and separation of sulfurous compounds from the heavier petroleum fractions prior to further processing thereof to yield lower boiling, more useful petroleum products in contact with sulfur-sensitive catalysts, and to simultaneously effect the conversion and separation of nitrogenous compounds which, alone or in combination with the sulfurous compounds, contribute to catalyst deactivation in said further processing. The nitrogenous compounds have proven to be the more refractory of the two, and catalysts effective to convert nitrogenous compounds to an acceptable level at hydrotreating conditions are invariably effective to convert the sulfurous compounds to an acceptably low level.

In general, the nitrogenous and sulfurous compounds are converted to readily separable gaseous products, ammonia and hydrogen sulfide, at hydrotreating conditions in contact with a catalytic composite of a Group VIB metal, typically molybdenum, and an iron group metal, usually nickel or cobalt, and a refractory inorganic oxide, usually alumina. Hydrotreating conditions normally include an imposed hydrogen pressure of from about 100 to about 3000 psig, with hydrogen being charged in contact with the catalytic composite together with recycle hydrogen to provide from about 1,000 to about 50,000 standard cubic feet of hydrogen per barrel of hydrocarbon feedstock. Hydrotreating conditions further include temperatures in the 200°–800° F. range, although temnperatures in the higher range, say from about 600° to about 800° F., are more suitable. Also, the hydrocarbon feedstock is generally processed over the catalytic composite at a liquid hourly space velocity of from about 0.5 to about 20.

The present invention is directed to an improved and relatively inexpensive method of manufacturing a spheroidal catalyst composition, and in one of its broad aspects, embodies a method for manufacturing a catalytic composite of from about 1 to about 10 wt. % iron group metal oxide, and from about 4 to about 30 wt. % Group VIB metal oxide, and alumina which comprises preparing a dry powdered blend of an alumina monohydrate, a compound of an iron group metal and a Group VIB metal compound, said compounds providing their respective oxides upon subsequent calcination in an oxidizing atmosphere, discharging the blend in a continuous and uniform stream onto a rotating pelletizing disc and rolling the blend into spheroidal pellets in contact with from about a 5 to about a 15 wt. % aqueous solution of a strong mineral acid sprayed on said rotating disc, and drying and calcining said pellets in an oxidizing atmosphere.

In accordance with the present method of catalyst manufacture, alumina is dry-mixed with an iron group metal compound and a Group VIB metal compound to form a free-flowing powdered blend. The iron group metal component of the catalyst of this invention is preferably nickel, and the Group VIB metal component is preferably molybdenum and the further description of the method of this invention is particularly directed thereto. The nickel compound, or other iron group metal compound, may be an oxide or a compound convertible to an oxide upon calcination at a temperature above about 700° F. in an oxidizing atmosphere. Similarly, the molybdenum compound or other Group VIB metal compound, may be an oxide thereof or one which will form an oxide upon calcination at the aforesaid conditions.

The alumina component of the aforesaid powdered blend is preferably an alpha-alumina monohydrate of the boehmite structure such as is produced by hydrolysis of an aluminum alcoholate or alkoxide and commercially available in a substantially pure finely powdered form. The alumina monohydrate admixed with nickel carbonate and molybdic anhydride constitutes a preferred powdered blend for use in the present method of manufacture. Other suitable iron group metal compounds include cobaltous nitrate, cobaltous sulfate, cobaltous oxide, cobaltous cobaltic oxide, cobaltous hydroxide, cobaltic hydroxide, nickel nitrate, nickel sulfate, etc., while other suitable Group VIB metal compounds include molybdenum dioxide, molybdenum sequioxide, molybdenum pentoxide, molybdic acid, ammonium molybdate, ammonium chromate, chromium acetate, chromium nitrate, tungstic acid, and the like.

Pursuant to the present invention, the powdered blend, preferably of alumina monohydrate, nickel carbonate and molybdic anhydride, is discharged in a continuous and uniform stream onto a rotating pelletizing disc, and rolled into spheroidal pellets in contact with an aqueous solution of a strong mineral acid sprayed on said rotating disc. A strong mineral acid, such as sulfuric acid, hydrochloric acid, nitric acid, etc., in from about a 5 to 15 wt. % aqueous solution, is particularly suitable. In any case, the peptizing agent is utilized in an amount to effect only limited peptization of the alumina component of the blend whereby the nickel and molybdenum components are adhered thereto. The resulting minute, coherent particles initially formed are rolled and agglomerated in a fashion typical of pelletizing disc operations to yield spheroidal pellets of desired size. Preferably, the acid employed is nitric acid, said acid being utilized in an amount to provide the same in from about a 1:10 to about a 1:20 weight ratio with the alumina discharged onto the pelletizing disc. The nitric acid is preferably employed in a weight ratio of about 1:20 with the alumina.

The spheroidal pellets recovered from the pelletizing disc are subsequently dried, suitably at a temperature of from about 212° to about 260° F. The dried pellets are then calcined in an oxidizing atmosphere whereby the nickel an molybdenum components are converted to their respective oxides. The spheroidal pellets thus prepared are physically stable at high temperature and in aqueous media, and are advantageously calcined in air containing about 50% steam, at a temperature of from about 700° to about 1200° F. over a period of from about 1 to about 8 hours.

The present invention is directed to the manufacture of spheroidal catalyst pellets. The advantages of spheroidal shaped catalysts have heretofore been recognized. In general, when utilized in a fixed bed type of operation, the spheroidal shaped particles permit a more uniform packing and thereby reduce variations in pressure drop through the bed, and accordingly reduce channeling of the reactant stream which otherwise results in a portion of the catalyst being by-passed. There are obvious advantages to the present method of manufacturing spheroidal catalyst pellets. Although the method is characterized by simplicity and requires a minimum of process equipment, the catalyst product exhibits exceptional activity, particularly with respect to the hydrotreating of residual fuel oils, and compares most favorably with catalysts, spheroidal or otherwise, prepared by more complex and sophisticated manufacturing procedures. The method of this invention has the advantage of simplicity in that the catalytic components, nickel and molybdenum, are incorporated in the alumina carrier material in one mixing operation and formed directly into spheroidal pellets.

One preferred embodiment of the present invention relates to a method of manufacturing a catalytic composite of from about 1 to about 5 wt. % nickel oxide, from about 5 to about 20 wt. % molybdenum oxide, and alumina which comprises preparing a substantially uniform powdered blend of boehmite alumina with molydic anhydride and nickel carbonate, discharging the blend in a uniform and continuous stream into contact with from about a 5 to about a 15 wt. % aqueous nitric acid solution on a rotating pelletizing disc and rolling the blend into spheroidal pellets, the nitric acid being sprayed onto said pelletizing disc at a rate to provide nitric acid in about a 1:20 weight ratio with the alumina discharged thereon, drying the spheroidal product and calcining the same at a temperature of from about 700° to about 1,200° F. in an air atmosphere containing about 50% stream. For example, dry, finely powdered boehmite alumina, molybdic anhydride and nickel carbonate are separately charged through a gravimetric weigh feeder to an in-line mixer, the alumina being charged at the rate of 99.3 lbs/hr., the molybdic anhydride ($MoO_3$) at 9.25 lbs/hr., and the nickel carbonate at 5.95 lbs/hr. The dry powdered blend from the in-line mixer is discharged in a constant and uniform flow onto a commercial pelletizing disc rotating at about 25 rpm with a pan angle of about 50° from horizontal. The dry powdered blend is discharged onto the pelletizing disc into contact with a spray of 5% aqueous nitric acid solution, the nitric acid solution being sprayed onto the disc at the rate of 94.5 lbs/hr. Spheroidal pellets are recovered from the disc at the rate of about 220 lbs/hr. and passed through a dual zone oxidizing oven on a belt conveyor. The pellets are heated in the first zone in contact with air containing about 50% steam at a temperature of 650° F., and in the second zone in contact with air containing about 10% steam at a temperature of about 1,100° F. The spheroidal pellets are passed through the oxidizing oven at a rate to establish residence time of about 1 hour in the first zone and about 2 hours in the second zone. The calcined spheroidal pellets contain 2.5 wt. % nickel and 5.6 wt. % molybdenum, calculated as the elemental metals.

I claim as my invention:

1. A method of manufacturing a catalytic composite of from about 1 to about 10 wt. % iron group metal oxide, from about 4 to about 30 wt. % Group VIB metal oxide, and alumina which comprises preparing a dry powdered blend of an alumina monohydrate, a compound of an iron group metal and a compound of a Group VIB metal, said compounds providing their respective oxides upon subsequent calcination in an oxidizing atmosphere, discharging the dry powdered blend in a continuous and uniform stream onto a rotating pelletizing disc and rolling the blend into spheroidal pellets in contact with from about a 5 to about a 15 wt. % aqueous solution of a strong mineral acid sprayed on said rotating disc, and drying the spheroidal pellets and calcining the same in an oxidizing atmosphere.

2. The method of claim 1 wherein said iron group metal compound is nickel carbonate.

3. The method of claim 1 wherein said Group VIB metal compound is molybdic anhydride.

4. The method of claim 1 wherein said mineral acid is nitric acid sprayed on said disc at a rate to provide the same in a weight ratio of from about 1:10 to about 1:20 with the alumina discharged thereon.

5. The method of claim 4 wherein said nitric acid is about a 5 wt. % aqueous solution thereof sprayed onto said disc at a rate to provide nitric acid in about a 1:20 weight ratio with the alumina discharged thereon.

6. The method of claim 1 wherein said spheroidal pellets are calcined in air at a temperature of from about 700° to about 1,200° F.

* * * * *